US012719996B2

(12) United States Patent
Takatsuki

(10) Patent No.: US 12,719,996 B2
(45) Date of Patent: Aug. 25, 2026

(54) IMAGE FORMING APPARATUS CAPABLE OF EASILY TAKING OVER DATA

(71) Applicant: KYOCERA Document Solutions Inc., Osaka (JP)

(72) Inventor: Yasushi Takatsuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 237 days.

(21) Appl. No.: 18/748,723

(22) Filed: Jun. 20, 2024

(65) Prior Publication Data

US 2024/0430375 A1 Dec. 26, 2024

(30) Foreign Application Priority Data

Jun. 20, 2023 (JP) ................................. 2023-100767

(51) Int. Cl.
*H04N 1/21* (2006.01)
*H04N 1/00* (2006.01)

(52) U.S. Cl.
CPC ........... *H04N 1/21* (2013.01); *H04N 1/00559* (2013.01); *H04N 1/00832* (2013.01); *H04N 1/0097* (2013.01)

(58) Field of Classification Search
None
See application file for complete search history.

(56) References Cited

U.S. PATENT DOCUMENTS

2002/0140970 A1* 10/2002 Kato ..................... G06F 3/1286 358/1.15

FOREIGN PATENT DOCUMENTS

JP 2021060934 A * 4/2021

* cited by examiner

*Primary Examiner* — Andrew H Lam
(74) *Attorney, Agent, or Firm* — Alleman Hall LLP

(57) ABSTRACT

An image forming apparatus includes an image forming portion, a sheet supply portion, and a control portion. The image forming portion forms an image on a sheet. The sheet supply portion supplies the sheet to the image forming portion. The control portion controls the image forming portion and the sheet supply portion. The control portion includes a first control substrate on which a first control element and a first storage element are mounted. The sheet supply portion includes a second control substrate on which a second control element and a second storage element are mounted. The first control element causes either one of the first storage element and the second storage element to store data related to the sheet supply portion and causes another one of the first storage element and the second storage element to back up the data related to the sheet supply portion at a predetermined timing.

8 Claims, 14 Drawing Sheets

FIG.3A

| SHEET FEED DRIVING TIME |
|---|
| TIME DISTANCE COUNTER SAVE AREA |
| ONE-SIDE COUNTER |
| DOUBLE-SIDED COUNTER |
| WHITE STREAK DETECTION COUNTER |
| CIS LAMP LIGHTING TIME (MINUTE) |

FIG.3B

| SYSTEM-RELATED [TOTAL CAS 2 COUNTER 1 - MEDIUM Byte] |
|---|
| EQUAL-MAGNIFICATION ADJUSTMENT |
| MOTOR ADJUSTMENT VALUE [TOTAL CAS 2 CHECKSUM 1 Byte] |
| FEED DEFLECTION AMOUNT ADJUSTMENT (FRONT SURFACE) |
| FEED DEFLECTION AMOUNT ADJUSTMENT (BACK SURFACE) |
| FEED DEFLECTION AMOUNT ADJUSTMENT (MIXED) |
| SHEET FEED / CONVEYING [TOTAL KFS CHECKSUM 1 Byte] |
| TIP END CIS TIMING ADJUSTMENT |
| REAR END CIS TIMING ADJUSTMENT |
| TIP END CCD TIMING ADJUSTMENT |
| REAR END CCD TIMING ADJUSTMENT |

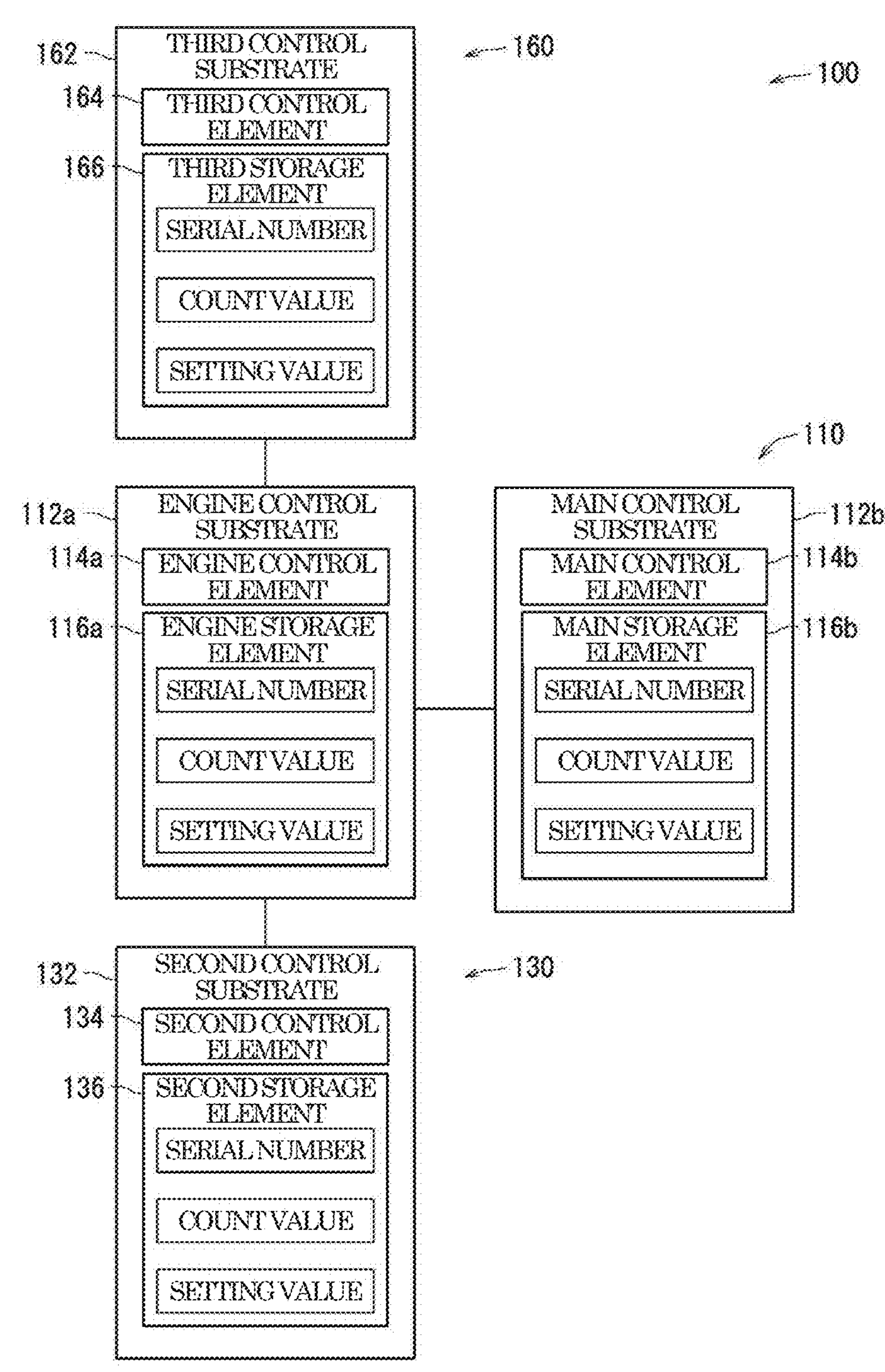
FIG.4
100
160
162
THIRD CONTROL SUBSTRATE
164
THIRD CONTROL ELEMENT
166
THIRD STORAGE ELEMENT
SERIAL NUMBER
COUNT VALUE
SETTING VALUE
110
112a
ENGINE CONTROL SUBSTRATE
114a
ENGINE CONTROL ELEMENT
116a
ENGINE STORAGE ELEMENT
SERIAL NUMBER
COUNT VALUE
SETTING VALUE
112b
MAIN CONTROL SUBSTRATE
114b
MAIN CONTROL ELEMENT
116b
MAIN STORAGE ELEMENT
SERIAL NUMBER
COUNT VALUE
SETTING VALUE
130
132
SECOND CONTROL SUBSTRATE
134
SECOND CONTROL ELEMENT
136
SECOND STORAGE ELEMENT
SERIAL NUMBER
COUNT VALUE
SETTING VALUE

FIG.7A

DATA A

DDDDD00001

DATA B

XXXXXXXXXX

FIG.7B

DATA A

XXXXXXXXXX

DATA B

CCCCC00002

FIG.8A

DATA A

AAAAA00001

DATA B

PPPPP00001

FIG.8B

DATA A

QQQQQ00002

DATA B

BBBBB00001

FIG.8C

DATA A

MMMMM00001

DATA B

PPPPP00002

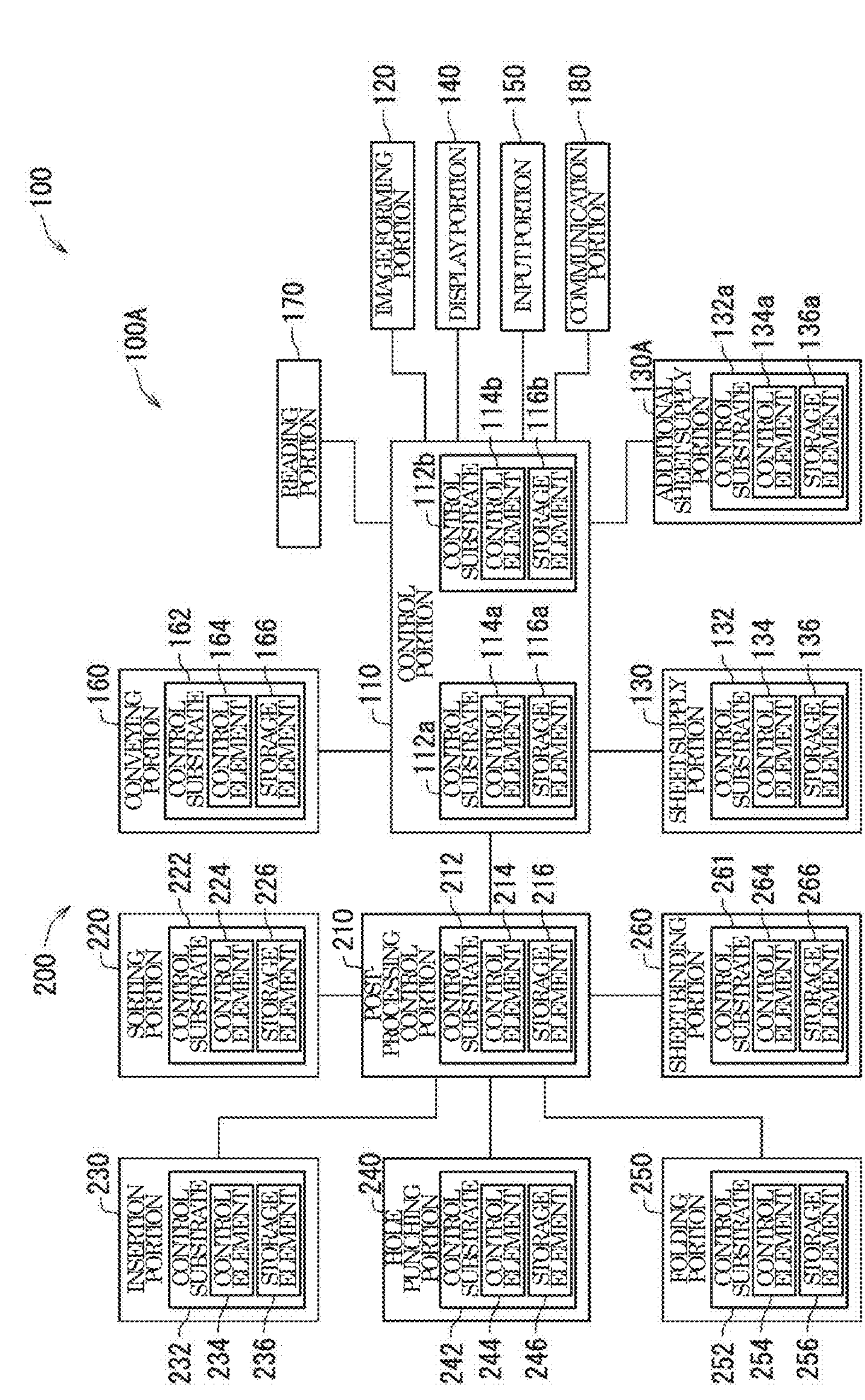
FIG.10
100
100A
200
170
READING PORTION
120
IMAGE FORMING PORTION
140
DISPLAY PORTION
150
INPUT PORTION
180
COMMUNICATION PORTION
110
CONTROL PORTION
112a
CONTROL SUBSTRATE
114a
CONTROL ELEMENT
116a
STORAGE ELEMENT
112b
CONTROL SUBSTRATE
114b
CONTROL ELEMENT
116b
STORAGE ELEMENT
160
CONVEYING PORTION
162
CONTROL SUBSTRATE
164
CONTROL ELEMENT
166
STORAGE ELEMENT
130
SHEET SUPPLY PORTION
132
CONTROL SUBSTRATE
134
CONTROL ELEMENT
136
STORAGE ELEMENT
130A
ADDITIONAL SHEET SUPPLY PORTION
132a
CONTROL SUBSTRATE
134a
CONTROL ELEMENT
136a
STORAGE ELEMENT
210
POST-PROCESSING CONTROL PORTION
212
CONTROL SUBSTRATE
214
CONTROL ELEMENT
216
STORAGE ELEMENT
220
SORTING PORTION
222
CONTROL SUBSTRATE
224
CONTROL ELEMENT
226
STORAGE ELEMENT
260
SHEET BINDING PORTION
261
CONTROL SUBSTRATE
264
CONTROL ELEMENT
266
STORAGE ELEMENT
230
INSERTION PORTION
232
CONTROL SUBSTRATE
234
CONTROL ELEMENT
236
STORAGE ELEMENT
240
HOLE PUNCHING PORTION
242
CONTROL SUBSTRATE
244
CONTROL ELEMENT
246
STORAGE ELEMENT
250
FOLDING PORTION
252
CONTROL SUBSTRATE
254
CONTROL ELEMENT
256
STORAGE ELEMENT

FIG.12

| | SERIAL NUMBER OF DATA A | SERIAL NUMBER OF DATA B | ALARM | ACTION |
|---|---|---|---|---|
| STORAGE ELEMENT 116b | AAAA00001 | AAAAA00002 | UNMATCHED | SELECT |
| STORAGE ELEMENT 116a | BBBB00002 | BBBBB00001 | UNMATCHED | SELECT |
| STORAGE ELEMENT 136 | XXXXXXXXX | CCCCC00002 | UNMATCHED | OVERWRITE TO NEW ONE |
| STORAGE ELEMENT 136a | DDDDD00001 | XXXXXXXXXX | UNMATCHED | OVERWRITE TO NEW ONE |
| STORAGE ELEMENT 166 | EEEEE00001 | EEEEE00001 | MATCHED | |
| STORAGE ELEMENT 216 | FFFFF00001 | FFFFF00001 | MATCHED | |
| STORAGE ELEMENT 226 | GGGGG00001 | GGGGG00001 | MATCHED | |
| STORAGE ELEMENT 236 | HHHHH00001 | HHHHH00001 | MATCHED | |
| STORAGE ELEMENT 246 | NO CONNECTION COMMUNICATION | KKKKK00002 | NOT CONNECTED | |
| STORAGE ELEMENT 256 | NO CONNECTION COMMUNICATION | LLLLL00002 | NOT CONNECTED | |
| STORAGE ELEMENT 266 | NO CONNECTION COMMUNICATION | NNNNN00002 | NOT CONNECTED | |

FIG.13
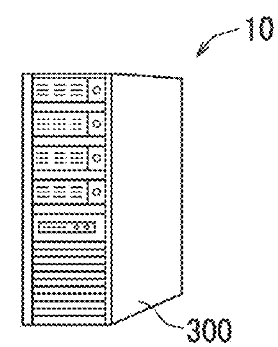
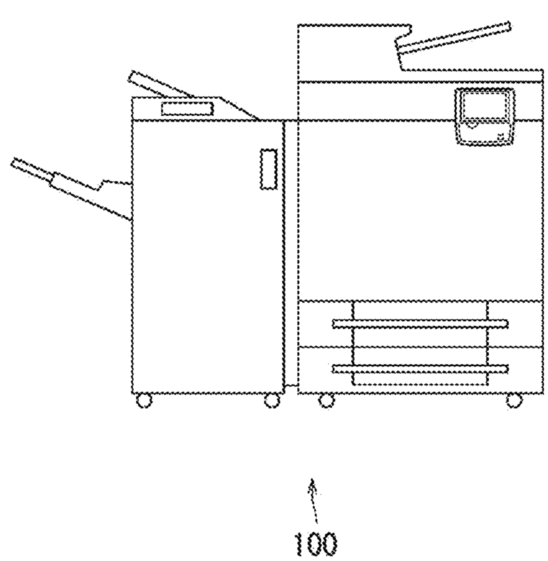

IMAGE FORMING APPARATUS CAPABLE OF EASILY TAKING OVER DATA

INCORPORATION BY REFERENCE

This application is based upon and claims the benefit of priority from the corresponding Japanese Patent Application No. 2023-100767 filed on Jun. 20, 2023, the entire contents of which are incorporated herein by reference.

BACKGROUND

The present disclosure relates to an image forming apparatus.

In an image forming apparatus such as a multifunction peripheral, even when a failure occurs in the image forming apparatus, the image forming apparatus can be easily restored by backing up data. Therefore, backing up device information of the multifunction peripheral in another multifunction peripheral is being discussed. For example, a configuration for backing up identification information in multifunction peripherals that are communicable with each other is known. With this configuration, the device information can be easily taken over even when replacing the multifunction peripheral.

SUMMARY

An image forming apparatus according to the present disclosure includes an image forming portion, a sheet supply portion, and a control portion. The image forming portion forms an image on a sheet. The sheet supply portion supplies the sheet to the image forming portion. The control portion controls the image forming portion and the sheet supply portion. The control portion includes a first control substrate on which a first control element and a first storage element are mounted. The sheet supply portion includes a second control substrate on which a second control element and a second storage element are mounted. The first control element causes either one of the first storage element and the second storage element to store data related to the sheet supply portion and causes another one of the first storage element and the second storage element to back up the data related to the sheet supply portion at a predetermined timing.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A is a table showing an example of items of count values;

FIG. 3B is a table showing an example of items of adjustment values;

FIG. 4 is a schematic diagram showing storage positions of data in the image forming apparatus according to the present embodiment;

FIG. 7A is a schematic diagram for explaining rewriting of backup data and data A;

FIG. 7B is a schematic diagram for explaining the rewriting of the backup data and the data A;

FIG. 8A is a schematic diagram for explaining the rewriting of the backup data and the data A;

FIG. 8B is a schematic diagram for explaining the rewriting of the backup data and the data A;

FIG. 8C is a schematic diagram for explaining the rewriting of the backup data and the data A;

FIG. 10 is a schematic block diagram of the image forming apparatus according to the present embodiment;

FIG. 12 is an example of a table showing a serial number of the data A, a serial number of data B, alarm, and action in the image forming apparatus according to the present embodiment;

FIG. 13 is a schematic diagram of an image forming system including the image forming apparatus according to the present embodiment.

DETAILED DESCRIPTION

Figure 1:
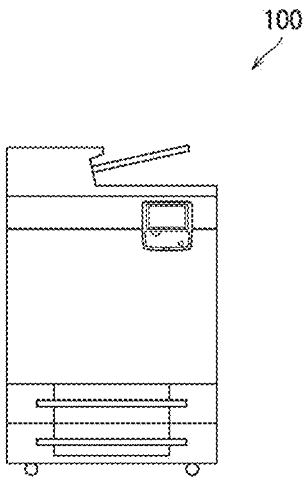
FIG. 1 is a schematic diagram of an image forming apparatus according to the present embodiment.

Hereinafter, an embodiment of an image forming apparatus according to the present disclosure will be described with reference to the drawings. It is noted that in the figures, the same or corresponding portions are denoted by the same reference numerals, and descriptions thereof will not be repeated.

First, an image forming apparatus 100 according to the present embodiment will be described with reference to FIG. 1. FIG. 1 is a schematic diagram of the image forming apparatus 100.

The image forming apparatus 100 forms an image on a sheet. The image forming apparatus 100 is, for example, a printer, a copying machine, or a multifunction peripheral. The image forming apparatus 100 may also have a facsimile function. In addition, the image forming apparatus 100 may either use electrophotography or an inkjet system.

It is noted that the image forming apparatus 100 may operate in an interlocking manner with another device. In addition, the image forming apparatus 100 may read a document sheet and generate image data.

Figure 2:
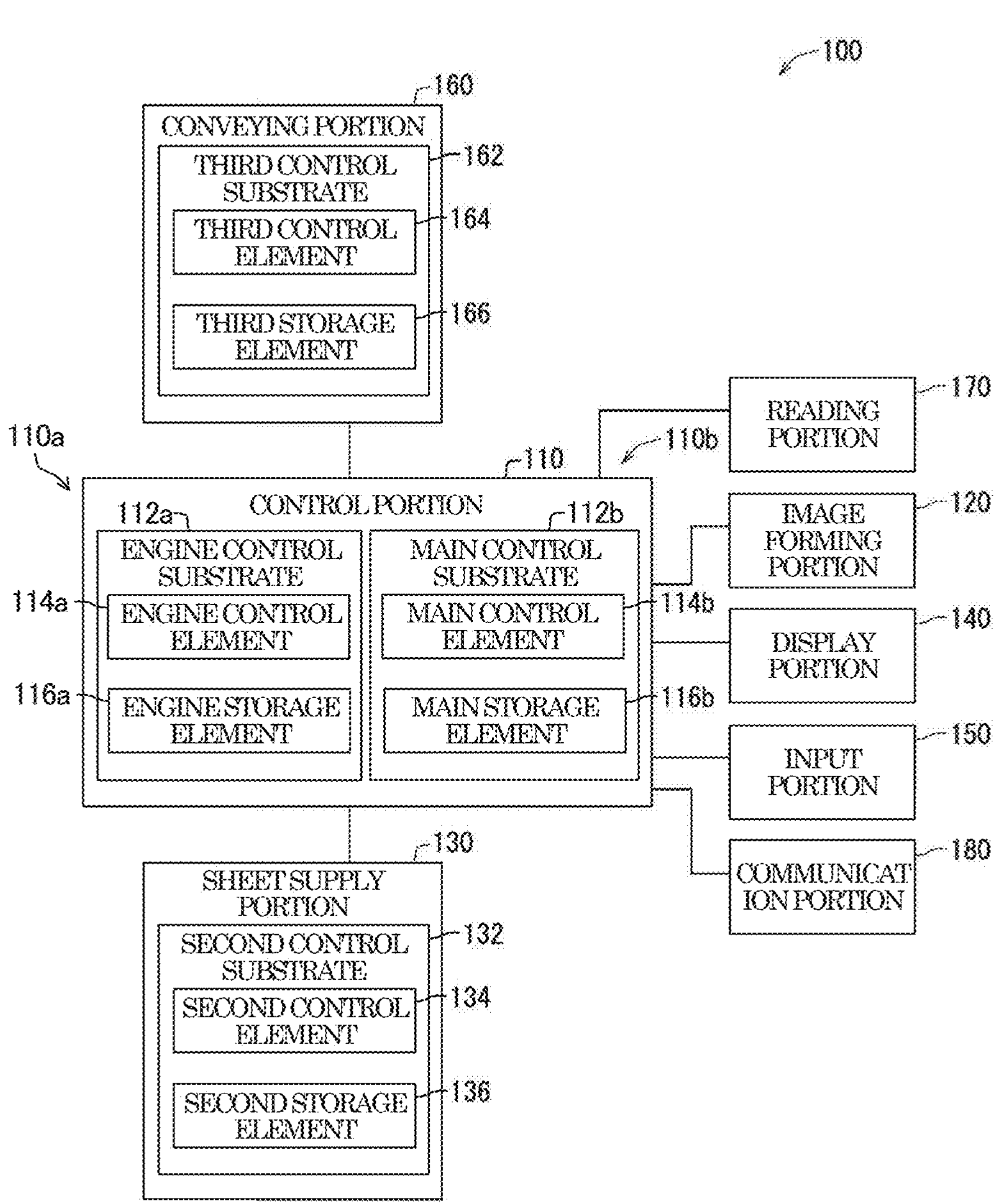
FIG. 2 is a schematic block diagram of the image forming apparatus according to the present embodiment.

Next, a configuration of the image forming apparatus 100 according to the present embodiment will be described with reference to FIG. 1 and FIG. 2. FIG. 2 is a schematic block diagram of the image forming apparatus 100.

As shown in FIG. 2, the image forming apparatus 100 includes a control portion 110, an image forming portion 120, a sheet supply portion 130, a display portion 140, an input portion 150, a conveying portion 160, and a reading portion 170. The control portion 110 controls the image forming portion 120, the sheet supply portion 130, the display portion 140, the input portion 150, the conveying portion 160, and the reading portion 170.

The image forming portion 120 forms an image on a sheet according to image data. The image forming portion 120 may form an image on a sheet using toner. Alternatively, the image forming portion 120 may form an image on a sheet using ink.

The sheet supply portion 130 stores sheets to be supplied to the image forming portion 120. The sheets stored in the sheet supply portion 130 are supplied to the image forming portion 120 when forming an image.

The display portion 140 includes a screen for displaying an image. The display portion 140 displays an image according to image data. Therefore, an operator of the image forming apparatus 100 can visually check the image data before the image forming portion 120 forms an image on a sheet.

The display portion 140 includes a liquid crystal display (LCD), an organic electroluminescence (EL) display, or a plasma display.

The input portion 150 is used to input an instruction of the operator. The operator can use the input portion 150 to operate the image forming apparatus 100. For example, the operator can use the input portion 150 to operate a screen displayed by the display portion 140.

The input portion 150 includes buttons or a keyboard. Alternatively, the input portion 150 may include a touch sensor. The display portion 140 and the input portion 150 may be a touch panel in which both of them are integrated.

The conveying portion 160 conveys a document sheet to the reading portion 170. Typically, the conveying portion 160 conveys a document sheet placed at a predetermined position to the reading portion 170. The conveying portion 160 functions as an auto document feeder (ADF).

The reading portion 170 reads a document sheet and generates image data. The reading portion 170 may read a document sheet conveyed by the conveying portion 160. Alternatively, the reading portion 170 may read a document sheet placed on a table.

Typically, the reading portion 170 includes an image pickup device. The image pickup device is, for example, a charged coupled detector (CCD). Alternatively, the image pickup device may be a contact image sensor (CIS).

The image forming apparatus 100 may further include a communication portion 180. The communication portion 180 communicates with an external device. For example, the communication portion 180 receives image data from the external device. In addition, the communication portion 180 receives operation signals from the external device. When the communication portion 180 receives an operation signal from the external device, the control portion 110 operates according to an instruction of the operation signal. After that, the communication portion 180 transmits information to the external device as necessary.

In FIG. 2, the control portion 110 includes an engine control portion 110*a* and a main control portion 110*b*. The engine control portion 110*a* controls mechanical operations of the image forming apparatus 100. The main control portion 110*b* controls overall operations of the image forming apparatus 100.

The engine control portion 110*a* includes an engine control substrate 112*a*. The engine control substrate 112*a* is an example of a "first control substrate". An engine control element 114*a* and an engine storage element 116*a* are mounted on the engine control substrate 112*a*. The engine control element 114*a* controls dynamic drive of the image forming apparatus 100. The engine control element 114*a* includes an arithmetic element. The arithmetic element includes a processor. In one example, the processor includes a central processing unit (CPU). In addition, the processor may also include an application specific integrated circuit (ASIC).

The engine storage element 116*a* stores data and computer programs. The engine control element 114*a* controls the sheet supply portion 130 and the conveying portion 160 using data.

For example, the engine storage element 116*a* is nonvolatile. In one example, the engine storage element 116*a* is a flash memory. Typically, the engine storage element 116*a* is a NOR-type flash memory.

The main control portion 110*b* includes a main control substrate 112*b*. The main control substrate 112*b* is an example of the "first control substrate". A main control element 114*b* and a main storage element 116*b* are mounted on the main control substrate 112*b*. The main control element 114*b* controls drive of the image forming apparatus 100. The main control element 114*b* includes an arithmetic element similarly to the engine control element 114*a*.

The main control element 114*b* uses data to control the image forming portion 120, the sheet supply portion 130, the display portion 140, the input portion 150, the conveying portion 160, the reading portion 170, and the communication portion 180. The main control element 114*b* controls the sheet supply portion 130 and the conveying portion 160 via the engine control element 114*a*. In addition, the main control element 114*b* controls the image forming portion 120, the display portion 140, the input portion 150, the reading portion 170, and the communication portion 180 without intervention of the engine control element 114*a*.

For example, the main storage element 116*b* is nonvolatile. In one example, the main storage element 116*b* is an SSD memory.

The sheet supply portion 130 includes a second control substrate 132. A second control element 134 and a second storage element 136 are mounted on the second control substrate 132. The second storage element 136 stores programs requisite for control by the second control element 134 of the sheet supply portion 130. The second control element 134 uses the programs and data to control a mechanism of the sheet supply portion 130. The second control element 134 includes an arithmetic element similarly to the engine control element 114*a*.

For example, the second storage element 136 is nonvolatile. In one example, the second storage element 136 is a flash memory. Typically, the second storage element 136 is an electrically erasable programmable read-only memory (EEPROM).

The conveying portion 160 includes a third control substrate 162. A third control element 164 and a third storage element 166 are mounted on the third control substrate 162. The third storage element 166 stores programs requisite for control by the third control element 164 of the conveying portion 160. The third control element 164 uses the programs and data to control a mechanism of the conveying portion 160. The third control element 164 includes an arithmetic element similarly to the engine control element 114*a*.

The third storage element 166 is nonvolatile. In one example, the third storage element 166 is an electrically erasable programmable read-only memory (EEPROM).

Next, the image forming apparatus 100 according to the present embodiment will be described with reference to FIG.

1 to FIG. 3B. FIG. 3A is a table showing an example of items of count values, and FIG. 3B is a table showing an example of items of adjustment values. The count value and adjustment value are each an example of "data" for controlling the mechanism of the conveying portion 160.

As shown in FIG. 3A, the count values are stored for a plurality of items in the conveying portion 160. An updated count value is stored every time a target event occurs in the conveying portion 160. For example, count values of a sheet feed driving time, a time distance counter save area, a one-side counter, a double-sided counter, a white streak detection counter, and a CIS lamp lighting time are stored.

As shown in FIG. 3B, the adjustment values of the conveying portion 160 are stored. Herein, line adjustment values of the conveying portion 160 are stored. Specifically, a system-related adjustment value, motor adjustment values, and timing adjustment values are stored. More specifically, an equal-magnification adjustment value is stored as the system-related adjustment value. As the motor adjustment values, a feed deflection adjustment amount in a case of conveying a front surface of a sheet, a feed deflection adjustment amount in a case of conveying a back surface of a sheet, and a feed deflection adjustment amount in a case where the front and back surfaces of the sheets are mixed are stored. As the timing adjustment values, a tip end CIS timing adjustment value, a rear end CIS timing adjustment value, a tip end CCD timing adjustment value, and a rear end CCD timing adjustment value are stored.

Herein, an example of the configuration of the image forming apparatus 100 according to the present embodiment will be described with reference to FIG. 1 to FIG. 4. FIG. 4 is a schematic diagram showing storage positions of data in the image forming apparatus 100.

As shown in FIG. 4, the control portion 110, the sheet supply portion 130, and the conveying portion 160 respectively include the engine control substrate 112*a* and main control substrate 112*b*, the second control substrate 132, and the third control substrate 162. Respectively mounted on the engine control substrate 112*a*, the main control substrate 112*b*, the second control substrate 132, and the third control substrate 162 are the engine control element 114*a*, the main control element 114*b*, the second control element 134, and the third control element 164 and also the engine storage element 116*a*, the main storage element 116*b*, the second storage element 136, and the third storage element 166.

The engine control substrate 112*a*, the main control substrate 112*b*, the second control substrate 132, and the third control substrate 162 communicate with one another. For example, the engine control substrate 112*a*, the main control substrate 112*b*, the second control substrate 132, and the third control substrate 162 communicate with one another by communication conforming to a UART or KDC three-line synchronous communication system.

The second control element 134 and the second storage element 136 are mounted on the second control substrate 132. The second storage element 136 stores, for example, a serial number of the second control substrate 132 and the count value and setting value in the sheet supply portion 130. The serial number, the count value, and the setting value are each an example of the "data".

Typically, the serial number indicates an identification number of the second control substrate 132. Further, the count value indicates a value obtained by counting the number of times an operation is carried out. Herein, the count value indicates a value obtained by counting the number of times a predetermined operation is carried out by the sheet supply portion 130. Furthermore, the setting value indicates an adjustable value that is set for carrying out the operation. Herein, the setting value indicates an adjustable value that is set when supplying a sheet in the sheet supply portion 130.

Similarly, the third control element 164 and the third storage element 166 are mounted on the third control substrate 162. The third storage element 166 stores, for example, a serial number of the third control substrate 162 and the count value and setting value in the conveying portion 160. The serial number, the count value, and the setting value are each an example of the "data".

The engine control element 114*a* and the engine storage element 116*a* are mounted on the engine control substrate 112*a*. The engine storage element 116*a* stores programs requisite for control by the engine control element 114*a* of the engine control substrate 112*a*. The engine storage element 116*a* stores, for example, a serial number of the engine control substrate 112*a* and the count value and setting value of the engine control portion 110*a*.

The main control element 114*b* and the main storage element 116*b* are mounted on the main control substrate 112*b*. The main storage element 116*b* stores programs requisite for control by the main control element 114*b* of the main control substrate 112*b*. The main storage element 116*b* stores, for example, a serial number of the main control substrate 112*b* and the count value and setting value of the main control portion 110*b*.

Incidentally, a configuration for backing up identification information in multifunction peripherals communicable with each other is known. With this configuration, device information can be easily taken over even when replacing the multifunction peripheral.

With the configuration described above, however, when replacing a substrate due to a failure or the like, if data stored in a storage element mounted on the substrate is not backed up in another multifunction peripheral, the previous data cannot be stored in a storage element of a newly-replaced substrate.

In contrast, in the image forming apparatus 100 according to the embodiment of the present disclosure, data can be easily taken over in the image forming apparatus 100 as will be described below.

In the image forming apparatus 100 according to the present embodiment, data stored in the engine storage element 116*a*, the main storage element 116*b*, the second storage element 136, and the third storage element 166 are backed up in other storage elements by backup processing. Thus, even when replacing the target control substrate, data can be easily taken over.

For example, in the image forming apparatus 100 according to the present embodiment, the engine storage element 116*a* stores data stored in the second storage element 136 as backup data. For example, the engine storage element 116*a* stores, as the backup data, the serial number of the second control substrate 132 and the count value and setting value that are stored in the second storage element 136. In addition, the engine storage element 116*a* stores data stored in the third storage element 166 as backup data. For example, the engine storage element 116*a* stores, as the backup data, the serial number of the third control substrate 162 and the count value and setting value of the conveying portion 160 that are stored in the third storage element 166.

Further, in the image forming apparatus 100 according to the present embodiment, the main storage element 116*b* stores data stored in the engine storage element 116*a* as backup data. For example, the main storage element 116*b* stores, as the backup data, the serial number of the engine control substrate 112*a* and the count value and setting value of the engine control portion 110*a* that are stored in the engine storage element 116*a*.

Figure 5:
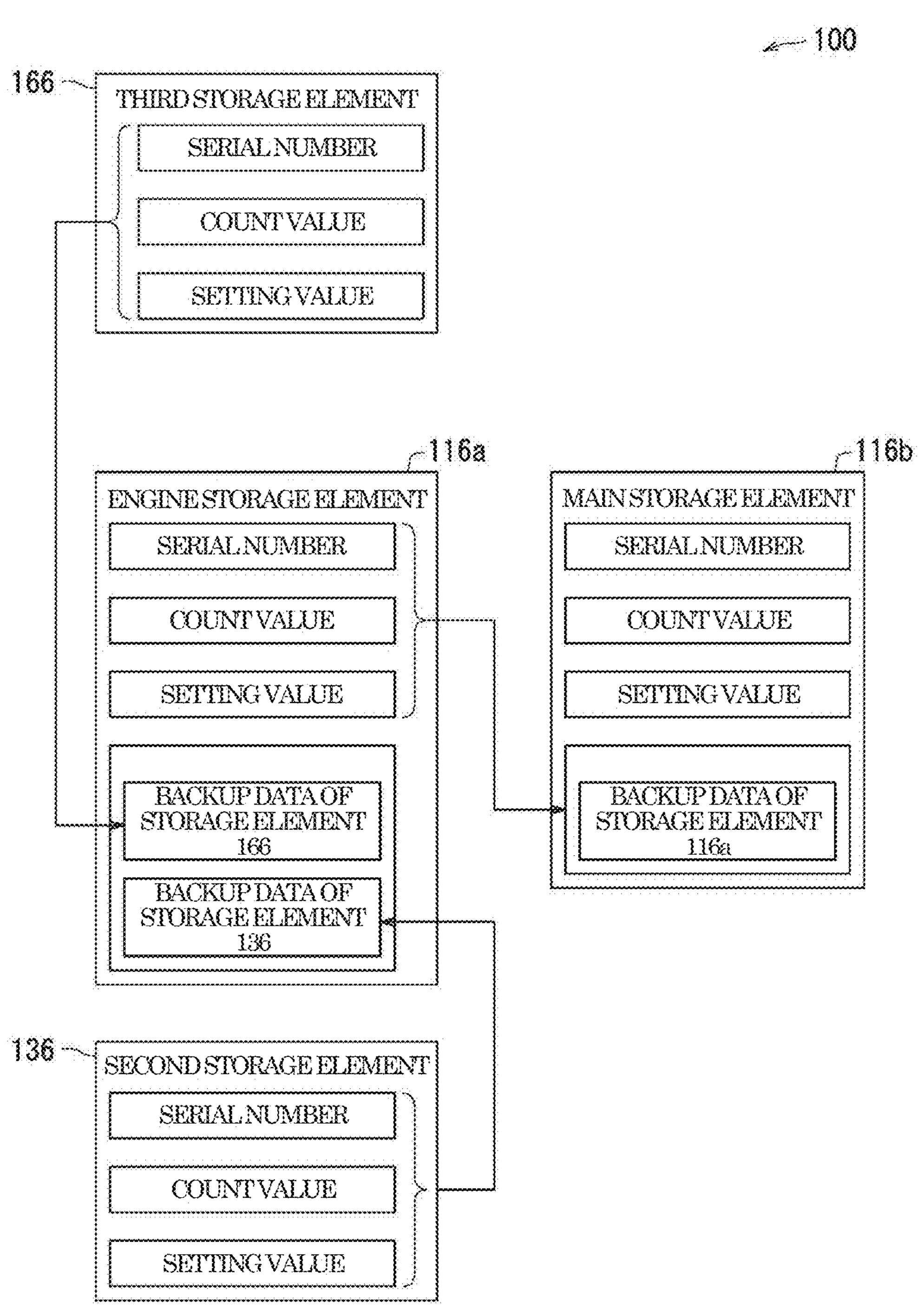
FIG. 5 is a schematic diagram showing storage positions of data and backup data in the image forming apparatus according to the present embodiment.

Herein, the configuration of the image forming apparatus 100 according to the present embodiment will be described with reference to FIG. 1 to FIG. 5. FIG. 5 is a schematic diagram showing the storage positions of data after the backup processing is carried out in the image forming apparatus 100. FIG. 5 shows the engine storage element 116*a*, the main storage element 116*b*, the second storage element 136, and the third storage element 166.

As shown in FIG. 5, the engine storage element 116*a* stores, as the backup data, data of the second storage element 136 and the third storage element 166 in addition to the serial number of the engine control substrate 112*a* and the count value and setting value of the engine control portion 110*a*. Moreover, the main storage element 116*b* of the main control substrate 112*b* stores, as the backup data, data of the engine storage element 116*a* in addition to the serial number of the main control substrate 112*b* and the count value and setting value of the main control portion 110*b*.

In this manner, by storing data stored in the storage element of the control substrate as the target (target control substrate) in the storage element of the control substrate different from the target control substrate as the backup data, the data of the target control substrate can be smoothly taken over even when replacing the target control substrate.

For example, after the second control substrate 132 being used is replaced with a new second control substrate 132, the second storage element 136 of the new second control substrate 132 stores the backup data stored in the engine storage element 116*a*. Thus, the data can be easily taken over.

Further, after the engine control substrate 112*a* being used is replaced with a new engine control substrate 112*a*, the engine storage element 116*a* of the new engine control substrate 112*a* stores the data stored in the second storage element 136. Thus, the data can be easily taken over.

It is noted that the backup processing is carried out at a predetermined timing. For example, the backup processing may be carried out when the image forming apparatus 100 returns from a sleep mode or when a power supply is turned on. Alternatively, the predetermined timing at which the backup processing is carried out may be set by a user or an administrator. The administrator may be a representative of the users or may be a person in charge of the maintenance of the image forming apparatus 100. In addition, the backup processing may be carried out automatically when the substrate is newly mounted. Alternatively, the backup processing may be carried out according to a simulation by the administrator. It is noted that when carrying out the backup processing according to the simulation, the backup processing may be carried out according to an input from the input portion 150.

Further, the predetermined timing may be a timing at which the number of times the data is stored reaches a first set number of times. The number of times the data is stored is a total value obtained by adding the number of times the count value is changed and the number of times the setting value is changed. Furthermore, the first set number of times is, for example, 10,000 times.

When the number of times the data is stored reaches a second set number of times, the engine control element 114*a* or the main control element 114*b* may switch the storage element to store the data and the storage element to back up the data. The second set number of times is, for example, 90,000 times. Thus, when a memory lifetime of the storage element to store the data is, for example, 100,000 times, by switching the storage element to the storage element to back up the data at, for example, 90,000 times, the number of times the storage element that is close to fulfilling the memory lifetime is caused to store data can be suppressed, and a long lifetime of the storage element can be achieved. In other words, by switching the storage element to store the data and the storage element to back up the data based on the number of times the storage element is caused to store data, it becomes possible to realize reduction without a raise in costs due to an increase in capacity or a change to a storage element having a long rewriting lifetime for supporting long-life products.

Figure 6:
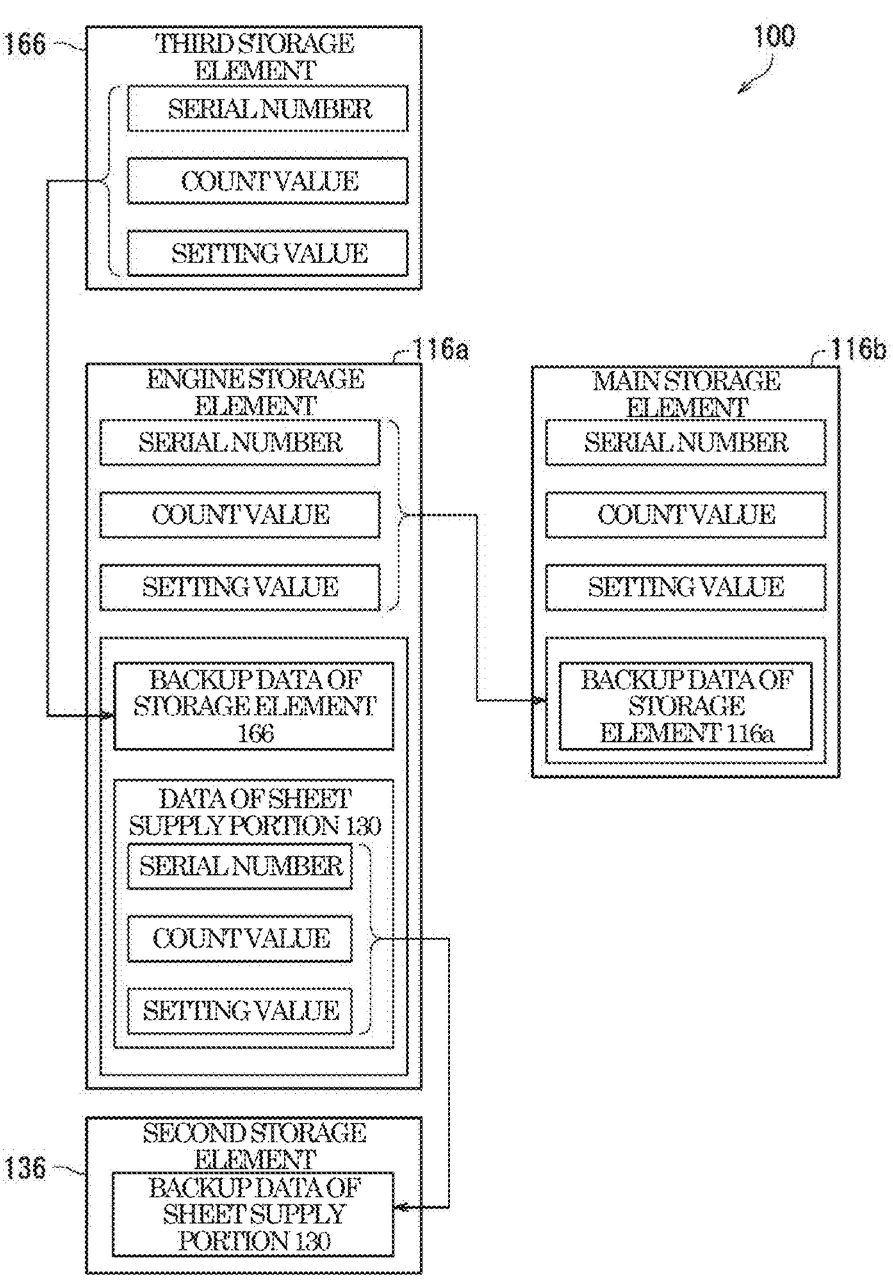
FIG. 6 is a schematic diagram showing the storage positions of data and backup data in the image forming apparatus according to the present embodiment.

Herein, the configuration of the image forming apparatus 100 according to the present embodiment will be described with reference to FIG. 1 to FIG. 6. FIG. 6 is a schematic diagram showing the storage positions of data after the backup processing is carried out in the image forming apparatus 100. FIG. 6 shows the engine storage element 116*a*, the main storage element 116*b*, the second storage element 136, and the third storage element 166.

As shown in FIG. 6, since the number of times the second storage element 136 is caused to store data has reached the second set number of times (for example, 90,000 times), the main control element 114*b* switches the storage element to store the data and the storage element to back up the data.

Specifically, the engine storage element 116*a* stores, for example, the serial number of the second control substrate 132 and the count value and setting value in the sheet supply portion 130.

Further, the second storage element 136 stores, as the backup data, the data stored in the engine storage element 116*a*. For example, the second storage element 136 stores, as the backup data, the serial number of the second control substrate 132 and the count value and setting value in the sheet supply portion 130 that are stored in the engine storage element 116*a*.

In this manner, by storing data stored in the storage element of the control substrate as the target (target control substrate) in the storage element of the control substrate different from the target control substrate as the backup data, the data of the target control substrate can be smoothly taken over even when replacing the target control substrate.

It is noted that the descriptions have been given on the case where, in the image forming apparatus 100 shown in FIG. 6, since the number of times the second storage element 136 is caused to store data has reached the second set number of times (for example, 90,000 times), the main control element 114*b* switches the storage element to store the data and the storage element to back up the data. However, the present embodiment is not limited to this. It is also possible for the main control element 114*b* to switch the storage element to store the data and the storage element to back up the data when the number of times the third storage element 166 is caused to store data reaches the second set number of times (for example, 90,000 times).

It is noted that although, in the image forming apparatus 100 shown in FIG. 1 to FIG. 6, the second storage element 136 stores the serial number of the second control substrate 132 and the count value and setting value in the sheet supply portion 130, and the engine storage element 116*a* stores the data of the second storage element 136 as the backup data, the present embodiment is not limited to this. The engine storage element 116*a* may store the serial number of the second control substrate 132 and the count value and setting value in the sheet supply portion 130, and the second storage element 136 may store, as the backup data, the serial number of the second control substrate 132 and the count value and setting value in the sheet supply portion 130 that are stored in the engine storage element 116*a*.

Then, the main control element 114*b* may switch the storage element to store the data and the storage element to back up the data when the number of times the engine storage element 116*a* is caused to store data reaches the second set number of times (for example, 90,000 times).

Figures 7A, 7B:
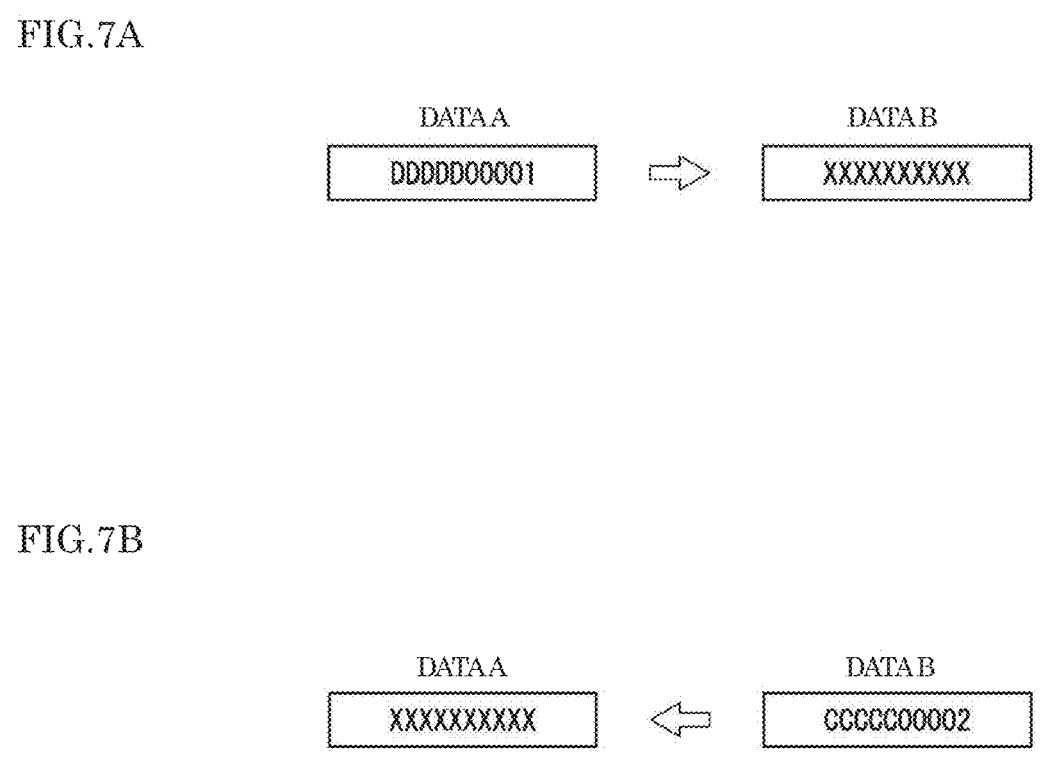

Next, the configuration of the image forming apparatus 100 according to the present embodiment will be described with reference to FIG. 7A to FIG. 7B. FIG. 7A to FIG. 7B are each a schematic diagram for explaining rewriting of data stored in a target storage element (data A) and data stored in a backup storage element that is to back up the data A (data B).

Typically, when the data A and the data B do not match, either of the data A and the data B is selected, and the unselected data is rewritten to the selected data.

As shown in FIG. 7A, when the data B stored in the backup storage element is initial data, the initial data is rewritten to the data A stored in the target storage element. For example, when a substrate storing backup data is replaced with a new substrate, initial data of the new substrate is rewritten to the data A stored in the target storage element, and thus the data A is backed up.

As shown in FIG. 7B, when the data A stored in the target storage element is initial data, the initial data is rewritten to the backed-up data B.

Figures 8A, 8B, 8C:
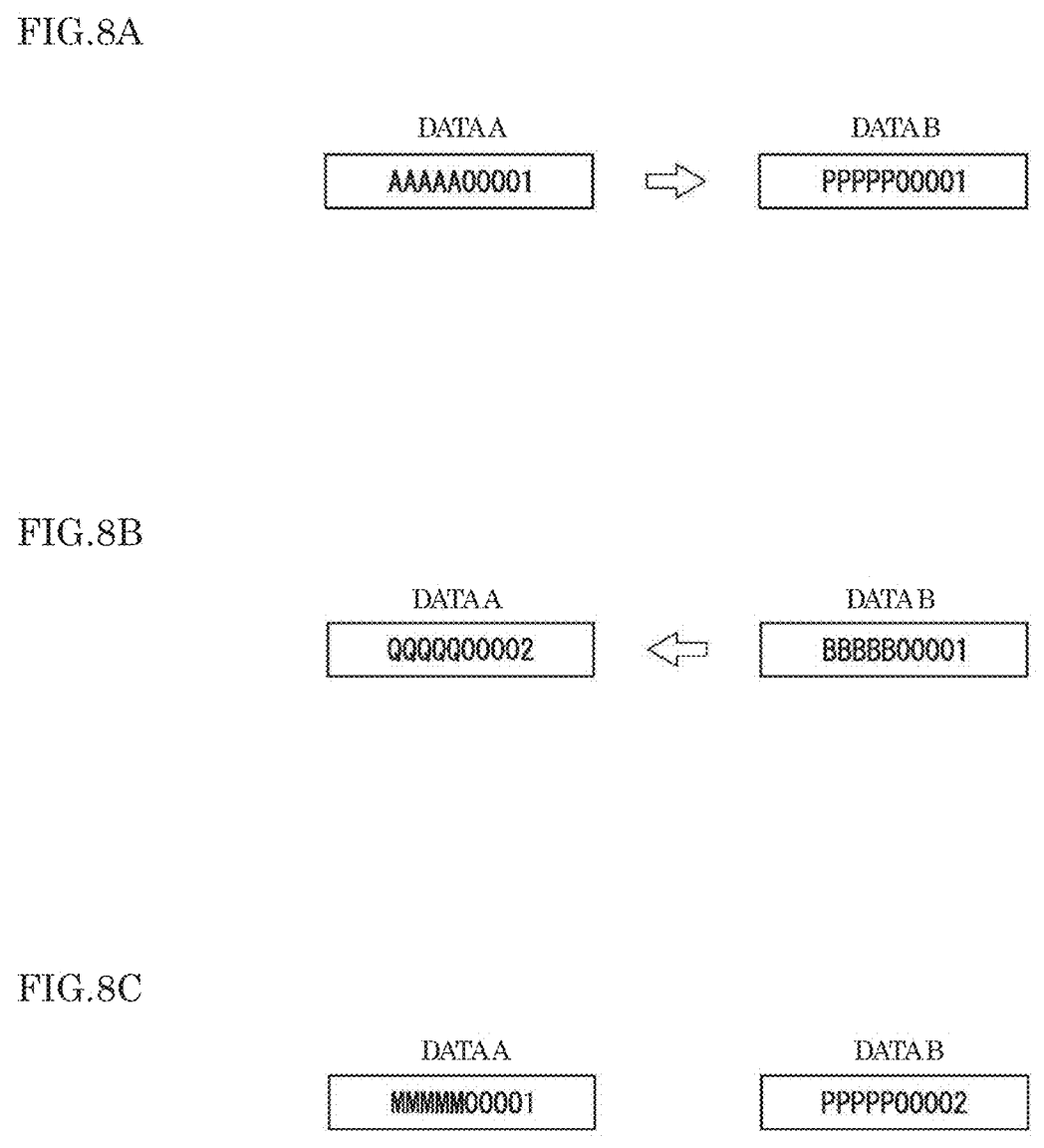

Next, the configuration of the image forming apparatus 100 according to the present embodiment will be described with reference to FIG. 8A to FIG. 8C. FIG. 8A to FIG. 8C are each a schematic diagram for explaining the rewriting of the data stored in the target storage element (the data A) and the data stored in the backup storage element (the data B).

For example, as shown in FIG. 8A, when a backup control substrate is replaced with a substrate already used, the data B shows third data unrelated to the data of the image forming apparatus 100 as the target. In this case, in a manual mode, the display portion 140 displays a screen for selecting either of the data A and the data B. The operator selects the data A. In this case, the data B is rewritten to the data A, and thus the data A is backed up.

As shown in FIG. 8B, when a target control substrate is replaced with a substrate already used, the data A shows the third data unrelated to the data of the image forming apparatus as the target. In this case, in the manual mode, the display portion 140 displays the screen for selecting either of the data A and the data B. The operator selects the data B. In this case, the data A is rewritten to the backed-up data B.

As shown in FIG. 8C, when both of the backup control substrate and the target control substrate are replaced with the substrates already used, the data A and the data B both show the third data unrelated to the data of the image forming apparatus as the target. In this case, in the manual mode, the display portion 140 displays a screen for rewriting both of the data A and the data B. The operator inputs data for both of the data A and the data B via the input portion 150.

It is noted that in the descriptions described above with reference to FIG. 2 to FIG. 8C, the control portion 110 includes the engine control portion 110*a* and the main control portion 110*b*, and the engine control portion 110*a* and the main control portion 110*b* respectively include the engine control substrate 112*a* and the main control substrate 112*b*. However, the present embodiment is not limited to this. The control portion 110 may include one control substrate on which the control element and the storage element are mounted.

Further, in the descriptions described above with reference to FIG. 1 to FIG. 8C, the image forming apparatus 100 has the image reading function in addition to the image forming function. However, the present embodiment is not limited to this. The image forming apparatus 100 does not need to have the image reading function.

Furthermore, although the image forming apparatus 100 is an apparatus enclosed by a single housing in the descriptions described above with reference to FIG. 1 to FIG. 8C, the present embodiment is not limited to this. The image forming apparatus 100 may be an apparatus in which devices respectively enclosed by housings are coupled. For example, in the image forming apparatus 100, a device which forms an image on a sheet may be coupled with an expansion device which performs processing on the sheet or the device before or after an image is formed on the sheet. As an example, the image forming apparatus 100 may include the device which forms an image on a sheet and a post-processing device which performs post-processing on the sheet on which an image has been formed in the device.

Figure 9:
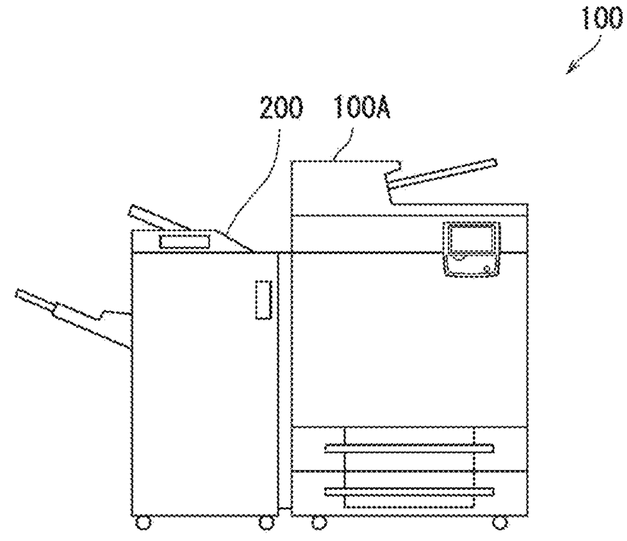
FIG. 9 is a schematic diagram of the image forming apparatus according to the present embodiment.

Next, the configuration of the image forming apparatus 100 according to the present embodiment will be described with reference to FIG. 9. FIG. 9 is a schematic diagram of the image forming apparatus 100.

As shown in FIG. 9, the image forming apparatus 100 includes an image forming device 100A and a post-processing device 200. The post-processing device 200 is arranged next to the image forming device 100A. Herein, the post-processing device 200 directly communicates with the image forming device 100A.

The image forming device 100A forms an image on a sheet. The image forming device 100A is, for example, a printer, a copying machine, or a multifunction peripheral. The image forming device 100A may also have a facsimile function. In addition, the image forming device 100A may either use electrophotography or an inkjet system. It is noted that the image forming device 100A may function similarly to the image forming apparatus 100 described above with reference to FIG. 1 to FIG. 6.

The post-processing device 200 performs post-processing on the sheet on which the image has been formed in the image forming device 100A. The post-processing device 200 may perform at least one of sorting, insertion of another sheet, hole punching, folding, and sheet binding on the sheet on which the image has been formed in the image forming device 100A.

It is noted that in the image forming apparatus 100 shown in FIG. 9, one post-processing device 200 is directly connected to the image forming device 100A. However, the present embodiment is not limited to this. A plurality of post-processing devices may be connected to the image forming device 100A. In this case, some of the plurality of post-processing devices may be directly connected to the image forming device 100A, and the rest of the post-processing devices may be indirectly connected to the image forming device 100A. In this case, it is favorable for the post-processing devices indirectly connected to the image forming device 100A to directly communicate with the post-processing devices directly connected to the image forming device 100A.

Next, the configuration of the image forming apparatus 100 according to the present embodiment will be described with reference to FIG. 9 and FIG. 10. FIG. 10 is a schematic block diagram of the image forming apparatus 100.

As shown in FIG. 10, the image forming apparatus 100 includes the image forming device 100A and the post-processing device 200. The image forming device 100A includes the control portion 110, the image forming portion 120, the sheet supply portion 130, an additional sheet supply portion 130A, the display portion 140, the input portion 150, the conveying portion 160, the reading portion 170, and the communication portion 180. In the image forming device 100A, the control portion 110, the image forming portion 120, the sheet supply portion 130, the display portion 140, the input portion 150, the conveying portion 160, the reading portion 170, and the communication portion 180 are similar to the control portion 110, the image forming portion 120, the sheet supply portion 130, the display portion 140, the input portion 150, the conveying portion 160, the reading portion 170, and the communication portion 180 of the image forming apparatus 100 described above with reference to FIG. 1 to FIG. 6, so overlapping descriptions will be omitted for the purpose of avoiding redundancy.

The control portion 110 controls the image forming portion 120, the sheet supply portion 130, the additional sheet supply portion 130A, the display portion 140, the input portion 150, and the conveying portion 160.

The additional sheet supply portion 130A stores the sheets to be supplied to the image forming portion 120. The sheets stored in the additional sheet supply portion 130A are supplied to the image forming portion 120 when forming an image.

The additional sheet supply portion 130A includes a control substrate 132*a*. A control element 134*a* and a storage element 136*a* are mounted on the control substrate 132*a*. The storage element 136*a* stores programs requisite for control by the control element 134*a* of the additional sheet supply portion 130A. The control element 134*a* uses the programs and data to control a mechanism of the additional sheet supply portion 130A. The control element 134*a* includes an arithmetic element similarly to the engine control element 114*a*.

The post-processing device 200 includes a post-processing control portion 210, a sorting portion 220, an insertion portion 230, a hole punching portion 240, a folding portion 250, and a sheet binding portion 260. The post-processing control portion 210 controls the sorting portion 220, the insertion portion 230, the hole punching portion 240, the folding portion 250, and the sheet binding portion 260.

The sorting portion 220 sorts the sheets plurally. Typically, the sorting portion 220 sorts the sheets to each of a plurality of trays.

The insertion portion 230 supplies sheets. The sheets supplied from the insertion portion 230 are used in combination with the sheet on which the image has been formed in the image forming device 100A.

The hole punching portion 240 supplies sheets. The hole punching portion 240 supplies the sheets to the image forming device 100A.

The folding portion 250 folds the sheet on which the image has been formed, at an appropriate position. For example, the folding portion 250 folds a sheet of an A3 paper size into a sheet of the same size as an A4 paper size.

The sheet binding portion 260 bundles a plurality of sheets on which images have been formed to bind the sheets into a book. The plurality of sheets can be bound by the sheet binding portion 260.

Figure 11:
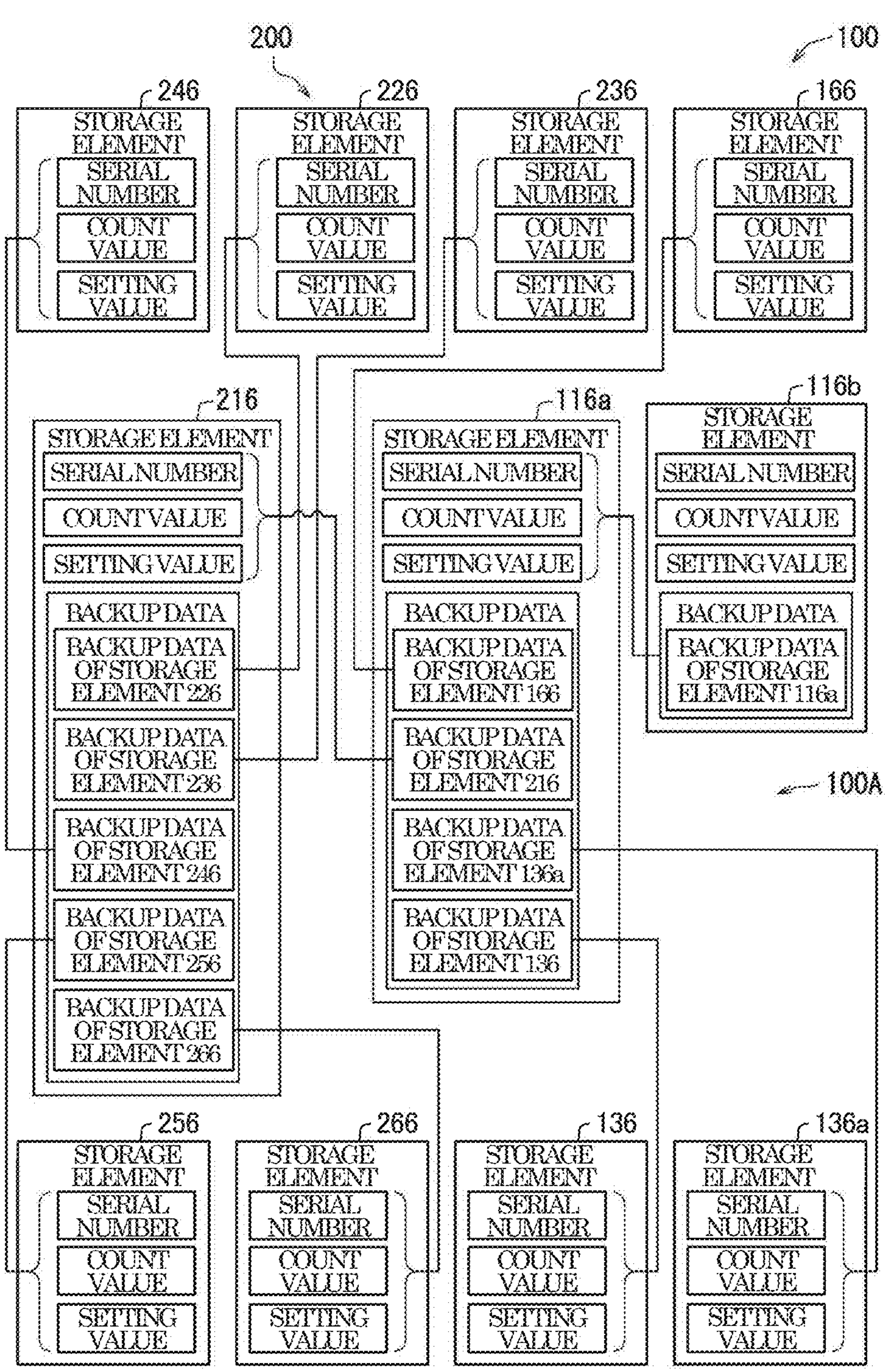
FIG. 11 is a schematic diagram showing the storage positions of data in the image forming apparatus according to the present embodiment.

Next, the configuration of the image forming apparatus 100 according to the present embodiment will be described with reference to FIG. 9 to FIG. 11. FIG. 11 is a schematic block diagram of the image forming apparatus 100.

As shown in FIG. 10, in the image forming device 100A, the additional sheet supply portion 130A includes the control substrate 132*a*, and the control element 134*a* and the storage element 136*a* are mounted on the control substrate 132*a*. The storage element 136*a* stores programs requisite for control by the control substrate 132*a* of the additional sheet supply portion 130A. In addition, the storage element 136*a* stores, for example, a serial number of the control substrate 132*a* and a count value and setting value in the additional sheet supply portion 130A.

The post-processing device 200 includes the post-processing control portion 210, the sorting portion 220, the insertion portion 230, the hole punching portion 240, the folding portion 250, and the sheet binding portion 260.

A control element 224 and a storage element 226 are mounted on a control substrate 222. The storage element 226 stores programs requisite for control by the control element 224 of the sorting portion 220. In addition, the storage element 226 stores, for example, a serial number of the control substrate 222 and a count value and setting value in the sorting portion 220.

Similarly, a control element 234 and a storage element 236 are mounted on a control substrate 232. The storage element 236 stores programs requisite for control by the control element 234 of the insertion portion 230. In addition, the storage element 236 stores, for example, a serial number of the control substrate 232 and a count value and setting value in the insertion portion 230.

Similarly, a control element 244 and a storage element 246 are mounted on a control substrate 242. The storage element 246 stores programs requisite for control by the control element 244 of the hole punching portion 240. In addition, the storage element 246 stores, for example, a serial number of the control substrate 242 and a count value and setting value in the hole punching portion 240.

Similarly, a control element 254 and a storage element 256 are mounted on a control substrate 252. The storage element 256 stores programs requisite for control by the control element 254 of the folding portion 250. In addition, the storage element 256 stores, for example, a serial number of the control substrate 252 and a count value and setting value in the folding portion 250.

Similarly, a control element 264 and a storage element 266 are mounted on a control substrate 261. The storage element 266 stores programs requisite for control by the control element 264 of the sheet binding portion 260. In addition, the storage element 266 stores, for example, a serial number of the control substrate 261 and a count value and setting value in the sheet binding portion 260.

A control element 214 and a storage element 216 are mounted on a control substrate 212. The storage element 216 stores programs requisite for control by the control element 214 of the post-processing control portion 210. In addition, the storage element 216 stores, for example, a serial number of the control substrate 212 and a count value and setting value in the post-processing control portion 210.

As shown in FIG. 11, the storage element 216 stores, as backup data, the data of the storage elements 226, 236, 246, 256, and 266 in addition to the serial number of the control substrate 212 and the count value and setting value in the post-processing control portion 210. In addition, the storage element 116*a* stores, as backup data, the data of the storage elements 136, 136*a*, 166, and 216 in addition to the serial number of the control substrate 112*a* and the count value and setting value in the engine control portion 110*a*. In addition, the storage element 116*b* of the main control substrate 112*b* stores, as backup data, the data of the storage element 116*a* in addition to the serial number of the control substrate 112*b* and the count value and setting value in the main control portion 110*b*.

Next, the configuration of the image forming apparatus 100 according to the present embodiment will be described with reference to FIG. 12. FIG. 12 is a table showing an example of a relationship among the data A (the serial number of the data A), the data B (the serial number of the data B), alarm, and action. Herein, the data A shows the serial number stored in the storage element of the target control substrate, and the data B shows the serial number stored in the storage element of another substrate that has backed up the serial number of the target control substrate.

As shown in the storage element 116*a* in FIG. 12, when the serial number of the data A and the serial number of the data B differ, the display portion 140 displays a screen for selecting which of the serial number of the data A and the serial number of the data B is to be set as the serial number of the control substrate 112*a*.

Specifically, the control element 114*a* reads the serial number stored in the storage element 116*a* as the serial number of the data A and reads the serial number stored in the storage element 116*b* as the serial number of the data B. After that, the control element 114*a* determines whether or not the serial number of the data A and the serial number of the data B match. When the serial number of the data A and the serial number of the data B differ, the control element 114*a* causes the display portion 140 to display a screen for selecting which of the serial number of the data A and the serial number of the data B is to be set as the serial number of the control substrate 112*a*. In this case, the operator selects either the serial number of the data A or the serial number of the data B as the serial number of the control substrate 112*a* via the input portion 150.

Further, as shown in the storage element 136 in FIG. 12, when the serial number of the data A indicates a serial number of an initial setting, the control element 134 rewrites the serial number of the data A stored in the control substrate 132 to the data B that has been stored in the storage element 116*a*.

Specifically, the control element 134 reads the serial number stored in the storage element 136 as the serial number of the data A and reads the serial number stored in the storage element 116*a* as the serial number of the data B. When the serial number of the data A is a number set to an unattached substrate, the control element 134 sets the data B as the serial number of the control substrate 132. In this case, the control element 134 rewrites the serial number of the data A stored in the storage element 136 to the serial number of the data B.

Further, as shown in the storage element 136*a* in FIG. 12, when the data B indicates a serial number of an initial setting, the control element 114*a* rewrites the serial number of the data B stored in the storage element 116*a* to the serial number of the data A stored in the storage element 136*a* to backup.

Specifically, the control element 134*a* reads the serial number stored in the storage element 136*a* as the serial number of the data A and reads the serial number stored in the storage element 116*a* as the serial number of the data B. When the data B is a number set to an unattached substrate, the control element 134*a* sets the serial number stored in the storage element 136*a* as the serial number of the control substrate 132. In this case, the control element 134*a* instructs to rewrite the serial number of the data B stored in the storage element 116*a* to the serial number of the storage element 136*a* to backup.

As shown in the storage element 166 in FIG. 12, when the serial number of the data B matches the serial number of the data A, the control element 164 rewrites neither the data A nor the data B.

Specifically, the control element 164 reads the serial number stored in the storage element 166 as the serial number of the data A and reads the serial number stored in the storage element 116*a* that stores the backup data as the serial number of the data B.

After that, the control element 164 determines whether or not the serial number of the data A and the serial number of the data B match. When the serial number of the data A and the serial number of the data B match, the control element 164 rewrites neither the data A nor the data B.

As shown in the storage element 246 in FIG. 12, when the serial number of the data A cannot be read, the control element 244 determines that the storage element 246 is unconnected and rewrites neither the data A nor the data B.

It is noted that although the operations are performed without operating in an interlocking manner with an external device in the image forming apparatus 100 shown in FIG. 1 to FIG. 12, the present embodiment is not limited to this. In the image forming apparatus 100, the operations may be performed in an interlocking manner with the external device.

Next, the image forming apparatus 100 according to the present embodiment will be described with reference to FIG. 1 to FIG. 13. FIG. 13 is a schematic diagram of an image forming system 10 including the image forming apparatus 100 according to the present embodiment.

In the present embodiment, the image forming system 10 includes the image forming apparatus 100 and an information processing apparatus 300. The information processing apparatus 300 is a so-called server.

In the image forming apparatus 100 according to the present embodiment, since backup data is stored inside the image forming apparatus 100, the information processing apparatus 300 does not store backup data of the image forming apparatus 100 herein. In this case, the information processing apparatus 300 may instruct a timing at which the image forming apparatus 100 stores backup data therein. It is noted that in addition to the fact that the backup data is stored inside the image forming apparatus 100, the information processing apparatus 300 may also store backup data of the image forming apparatus 100.

Figure 14:
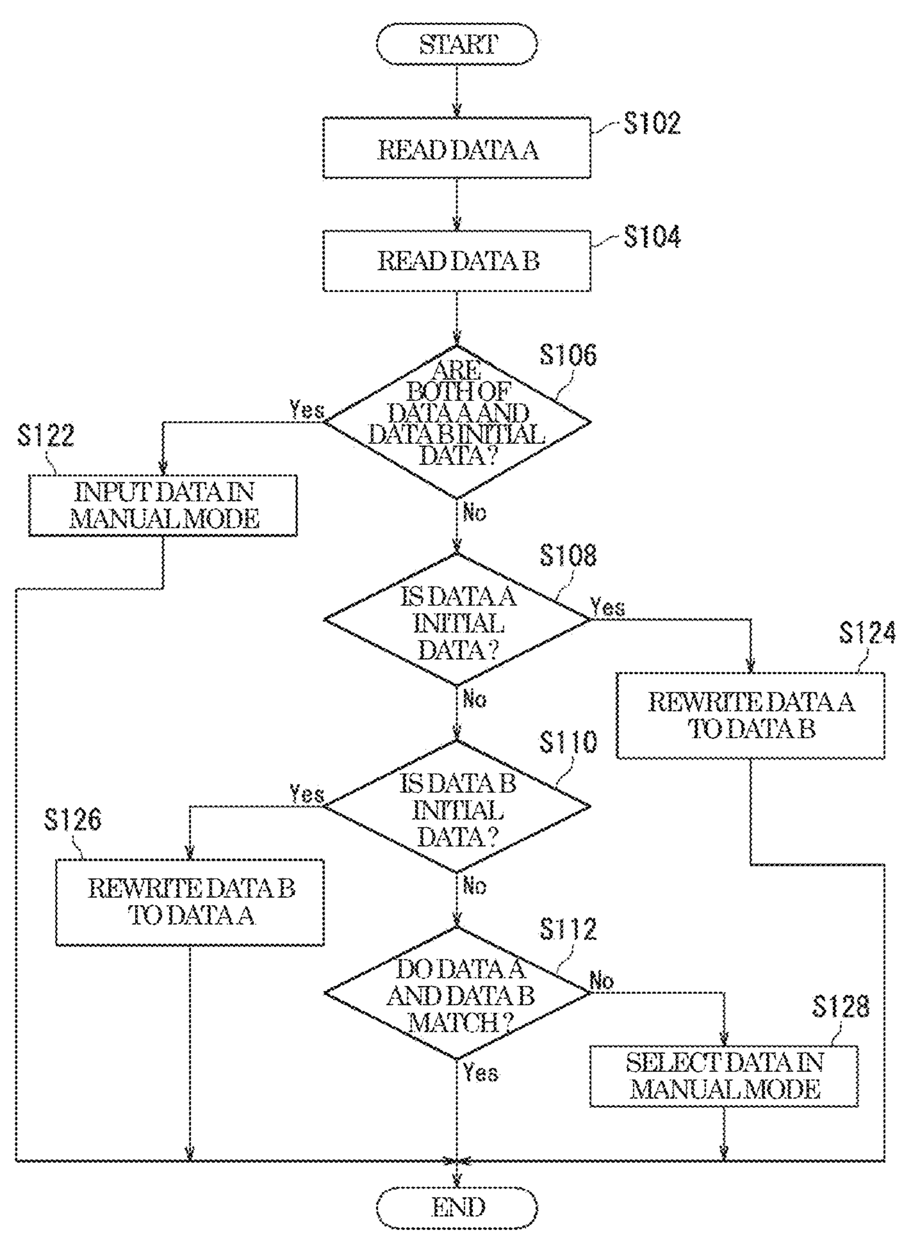
FIG. 14 is a flowchart showing the rewriting of the data A and the data B in the image forming apparatus according to the present embodiment.

Next, rewriting of the data A and the data B in the image forming apparatus 100 according to the present embodiment will be described with reference to FIG. 14. FIG. 14 is a flowchart showing the rewriting of the data A and the data B in the image forming apparatus 100 according to the present embodiment.

As shown in FIG. 14, in Step S102, the target control element reads the data A from the target storage element.

In Step S104, the target control element reads the data B from the backup storage element.

In Step S106, the target control element determines whether or not both of the data A and the data B are initial data.

When it is determined that both of the data A and the data B are initial data (Yes in Step S106), the processing advances to Step S122. When it is determined that at least one of the data A and the data B is not initial data (No in Step S106), the processing advances to Step S108.

In Step S108, the target control element determines whether or not the data A is initial data. When it is determined that the data A is initial data (Yes in Step S108), the processing advances to Step S124. When it is determined that the data A is not initial data (No in Step S108), the processing advances to Step S110.

In Step S110, the target control element determines whether or not the data B is initial data. When it is determined that the data B is initial data (Yes in Step S110), the processing advances to Step S126. When it is determined that the data B is not initial data (No in Step S110), the processing advances to Step S112.

In Step S112, the target control element determines whether or not the data A and the data B match. When it is determined that the data A and the data B match (Yes in Step S112), the processing is ended. When it is determined that the data A and the data B do not match (No in Step S112), the processing advances to Step S128.

In Step S122, the target control element shifts the mode to the manual mode for inputting data. The administrator inputs data to a target storage element via the input portion 150 in the manual mode. After that, the processing is ended.

In Step S124, the target control element rewrites the data A stored in the target storage element to the data B stored in the backup storage element. After that, the processing is ended.

In Step S126, the target control element rewrites the data B stored in the backup storage element to the data A stored in the target storage element. After that, the processing is ended.

In Step S128, the target control element shifts the mode to the manual mode for selecting data. The administrator selects either the data A or the data B via the input portion 150 in the manual mode and inputs the selected data to the target storage element. After that, the processing is ended.

According to the present embodiment, even when the data A stored in the target storage element and the data B stored in the backup storage element do not match, appropriate data can be stored in the target storage element and the backup storage element.

Heretofore, the embodiment of the present disclosure has been described with reference to the drawings. It is noted that the present disclosure is not limited to the embodiment described above and can be variously modified without departing from the gist of the present disclosure. In addition, the plurality of constituent elements disclosed in the embodiment described above can be combined as appropriate to form various disclosures. For example, some of the constituent elements may be deleted from all of the constituent elements disclosed in the embodiment. Further, the constituent elements of different embodiments may be combined as appropriate. The drawings are schematically illustrated while mainly showing the respective constituent elements to help understand the present disclosure. The thickness, length, number, interval, and the like of the respective constituent elements shown in the figures may differ from the actual thickness, length, number, interval, and the like for convenience in creating the drawings. Further, the material, shape, size, and the like of the respective constituent elements described in the embodiment above are mere examples that are not limited in particular, and may be variously modified substantially without departing from the effects of the present disclosure.

In the descriptions on the present embodiment made with reference to FIG. 2, both of the backup control substrate and the target control substrate are replaced with the substrates already used, and when either of the data is not related to the data of the image forming apparatus as the target, the display portion 140 displays the screen for rewriting both of the data A and the data B in the manual mode. However, the present disclosure is not limited to this.

The present disclosure is favorably used in the image forming apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

an image forming portion which forms an image on a sheet;

a sheet supply portion which supplies the sheet to the image forming portion; and a control portion which controls the image forming portion and the sheet supply portion, wherein the control portion includes a first control substrate on which a first control element and a first storage element are mounted, the sheet supply portion includes a second control substrate on which a second control element and a second storage element are mounted, and the first control element causes either one of the first storage element and the second storage element to store data related to the sheet supply portion and causes another one of the first storage element and the second storage element to back up the data related to the sheet supply portion at a predetermined timing.

2. The image forming apparatus according to claim 1, wherein the predetermined timing is when a number of times the data related to the sheet supply portion is stored reaches a first set number of times, and when the number of times the data related to the sheet supply portion is stored reaches a second set number of times, the first control element switches the storage element to store the data and the storage element to back up the data.

3. The image forming apparatus according to claim 1, further comprising:

a conveying portion which conveys a document sheet; and a reading portion which reads the document sheet conveyed by the conveying portion, wherein the conveying portion includes a third control substrate on which a third control element and a third storage element are mounted, and the first control element causes either one of the first storage element and the third storage element to store data related to the conveying portion and causes another one of the first storage element and the third storage element to back up the data related to the conveying portion.

4. The image forming apparatus according to claim 1, further comprising:

a display portion which displays an image on a screen; and an input portion to which an operation of an operator is input, wherein the control portion includes an engine control portion which controls the sheet supply portion, and a main control portion which controls the display portion, the input portion, and the engine control portion, the engine control portion includes an engine control substrate on which an engine control element and an engine storage element are mounted, the main control portion includes a main control substrate on which a main control element and a main storage element are mounted, and the main control element causes either one of the main storage element and the engine storage element to store data related to the engine control portion and causes another one of the main storage element and the engine storage element to back up the data related to the engine control portion, and causes either one of the main storage element and the engine storage element to store data related to the main control portion and causes another one of the main storage element and the engine storage element to back up the data related to the main control portion.

5. The image forming apparatus according to claim 1, further comprising a post-processing portion which processes the sheet, wherein the post-processing portion includes a fourth control substrate on which a fourth control element and a fourth storage element are mounted, and the first control element causes either one of the first storage element and the fourth storage element to store data related to the post-processing portion and causes another one of the first storage element and the fourth storage element to back up the data related to the post-processing portion.

6. The image forming apparatus according to claim 1, further comprising a communication portion capable of communicating with an information processing apparatus, wherein based on an instruction from the information processing apparatus received by the communication portion, the first control element causes either one of the first storage element and the second storage element to store the data related to the sheet supply portion and causes another one of the first storage element and the second storage element to back up the data related to the sheet supply portion.

7. The image forming apparatus according to claim 1, wherein when the data stored in the second storage element and the data stored in the first storage element do not match, one of the data stored in the second storage element and the data stored in the first storage element is rewritten.

8. The image forming apparatus according to claim 1, wherein when either one of the data stored in the second storage element and the data stored in the first storage element is initial data, the initial data is rewritten to another one of the data stored in the second storage element and the data stored in the first storage element.

* * * * *